INVENTORS.
J. G. ASTON
S. V. R. MASTRANGELO
BY Hudson and Young
ATTORNEYS

Patented Oct. 21, 1952

2,614,909

UNITED STATES PATENT OFFICE 2,614,909

FRACTIONAL FUSION APPARATUS

John G. Aston and Sebastian V. R. Mastrangelo, State College, Pa., assignors to Phillips Petroleum Company, a corporation of Delaware Application February 21, 1950, Serial No. 145,404

5 Claims. (Cl. 23—280)

This invention relates to the purification of impure materials. In one aspect, it relates to apparatus for removing impurities from an impure material. In another aspect, it relates to apparatus for purification by fractional fusion. In still another aspect, it relates to apparatus for accelerating the adiabatic attainment of state equilibrium in a mass of granular material in contact with a liquid of the same components.

In the purification of compounds or the separation of mixtures of compounds by fractional fusion, one of the difficulties arises from the fact that state equilibrium cannot be rapidly attained. This is partly due to the fact that the solid and liquid do not move about within the system and heat transfer between the phases is slow. If the material to be purified has a very low freezing point, the use of mechanical agitation presents so many difficulties that it is used only as a last resort.

We have discovered an apparatus wherein the adiabatic attainment of state equilibrium is considerably accelerated without using mechanical agitation. Our invention is particularly useful in the purification of low-melting compounds by the fractional fusion method. In our apparatus, we provide a closed, thermally insulated sample or material receiving container with means for controlling the rate and amount of heat added to the material to be purified. Inside the thermally insulated container, we provide a heat conducting material. Heat added to the container at one point is rapidly transferred to all parts of the material within the container.

The principal object of our invention is to provide an apparatus for low-temperature fractional fusion separations.

Another object is to provide a means for accelerating the adiabatic attainment of state equilibrium within the body of a sample being purified.

Another object is to provide an apparatus for rapidly transferring heat throughout a sample being purified.

Other objects and advantages of our invention will be apparent from reading the following drawings, description, and claims.

Figure 1:
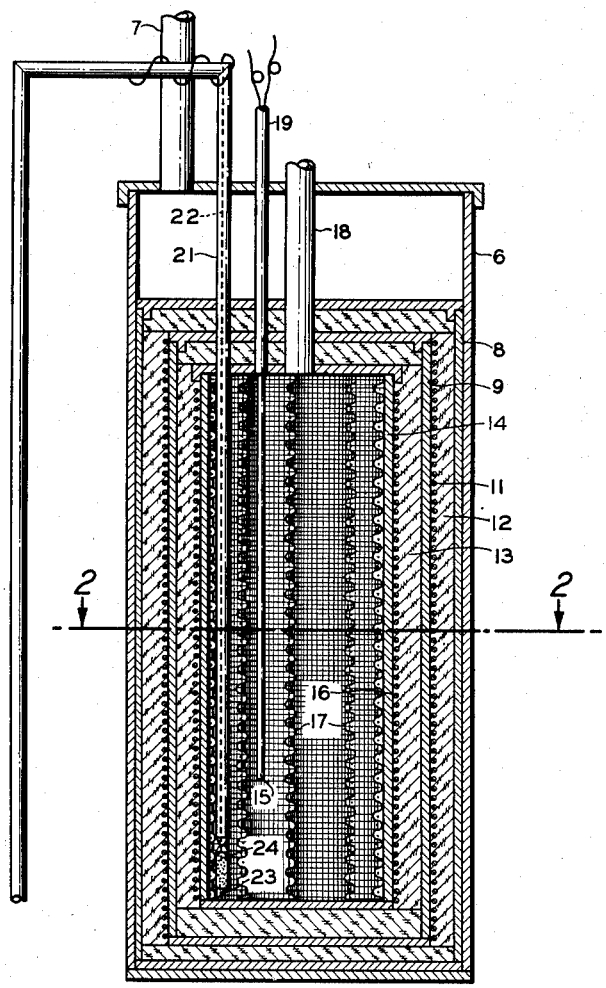
Figure 1 is a longitudinal sectional view of our fractional fusion apparatus wherein the means for rapidly dispersing heat throughout the material in the container is a loosely-wound roll of metal gauze.

In Figure 1, an outer closed container 6 is provided with an evacuation tube 7. Inside the outer container is a closely-fitting closed container 8 of a heat-radiating material. Inside container 8 is a smaller, closed container 9, around the periphery of which are a number of turns of wire 11 for heating container 9. Between radiation shield 8 and container 9 is a layer of insulating material 12, such as cork. Inside container 9 is another layer of insulating material 13, inside of which is a sample container 14 comprising a closed vessel around the outer periphery of which is wound an electrical heater 16. Inside container 14 is a vertically-positioned loosely-wound roll of wire gauze 17. A filling tube 18 extends from the outside of container 6 to the top of inner container 14. The electrical leads for the heaters 11 and 16 pass from the outside to the inside of the apparatus through conduit 19. A liquid-removal tube 21 leads from the bottom of the sample container through the top to the outside. Inside tube 21 is a conduction heater 22. In this case, the conduction heater is a wire which is electrically heated. At the bottom of tube 21 is a drilled plug 23 above which is a porous plug 24.

Figure 2:
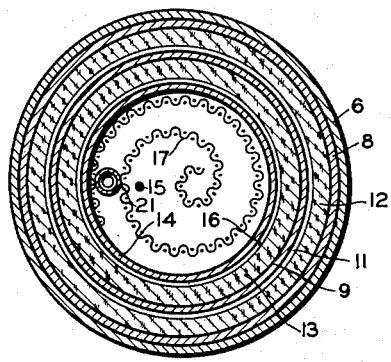
Figure 2 is a cross sectional view of the apparatus shown in Figure 1 taken along line 2—2.

In Figure 2, the spiral gauze 17 is more clearly shown with relation to inner container 14.

Figure 3:
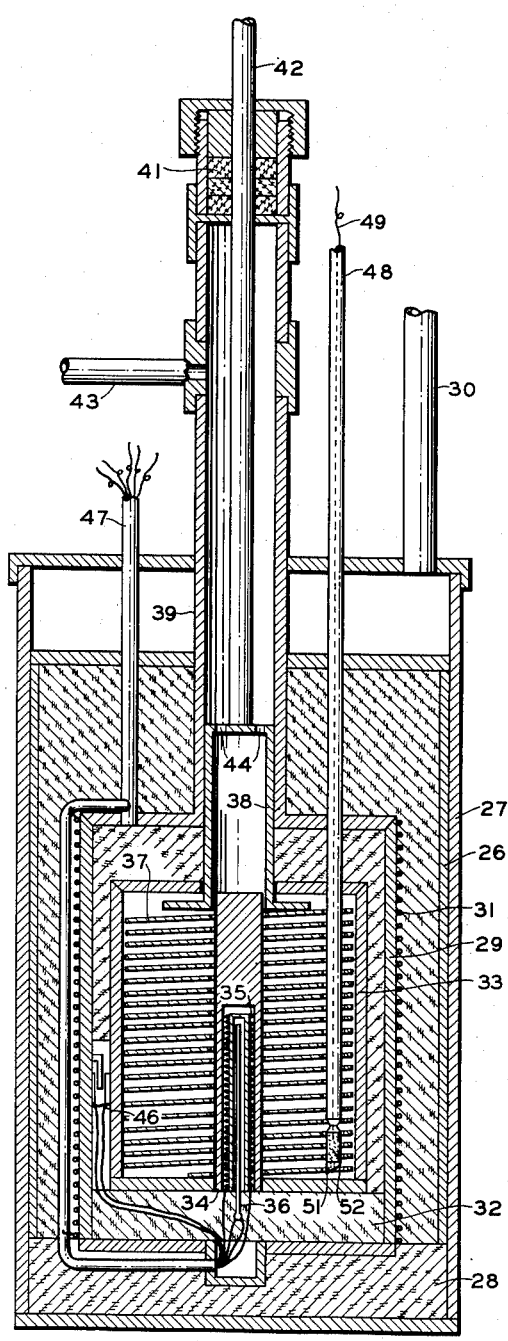
Figure 3 is another modification of our apparatus wherein the heat-dispersing means is a spiral metal ribbon with means for compressing the spiral ribbon to squeeze out any liquid contained in the solid trapped between the vanes.

In Figure 3, radiation shield 26 fits closely inside outer container 27. A pumping tube 30 is provided for evacuating the system. Supported within the radiation shield 26 by means of a layer of insulating material 28 is a heater shield 29 which is heated by means of an electrical heater 31 wound around the outside. Spaced within the heater shield 29 by means of a layer of insulation 32 is a sample container 33. Extending upwardly into said sample container is a heater well 34 and heater 36. Inside container 33 is a spiral ribbon 37, the bottom turn of which is secured to the bottom of container 33 and the top turn of which is secured to an activator vane 38 which fits slidably over the top of heater well 34 and which also fits slidably into column 39 which extends upwardly from heater shield 29.

At the upper extremity of tube 39 is a sealing gland 41 through which activator rod 42 extends downwardly to activator vane 38 to which it is secured. At a point intermediate the extremities of the tube 39, a side tube 43 enters said tube 39 for introducing material into sample container 33. Openings 44 in the top of activator vane 38 permit liquid introduced through tube 43 to flow into container 33.

A thermocouple 46 is provided for controlling the heat added through heater shield 29 according to the temperature difference between the inner wall of heater shield 29 and the outer wall of sample container 33 as heater 35 and thermocouple 36 extend upwardly into heater well 34 for heating container 33. The electrical leads for heater 35, thermocouple 36, heater 31, and thermocouple 46 enter the apparatus through conduit 47.

A product removal tube 48 extends from the outside to the bottom of container 33, and running along the length of said tube inside is a conduction heater 49. At the bottom of tube 48 is a drilled plug 51 and a porous plug 52 which filter solids out of the liquid being removed.

Figure 4:
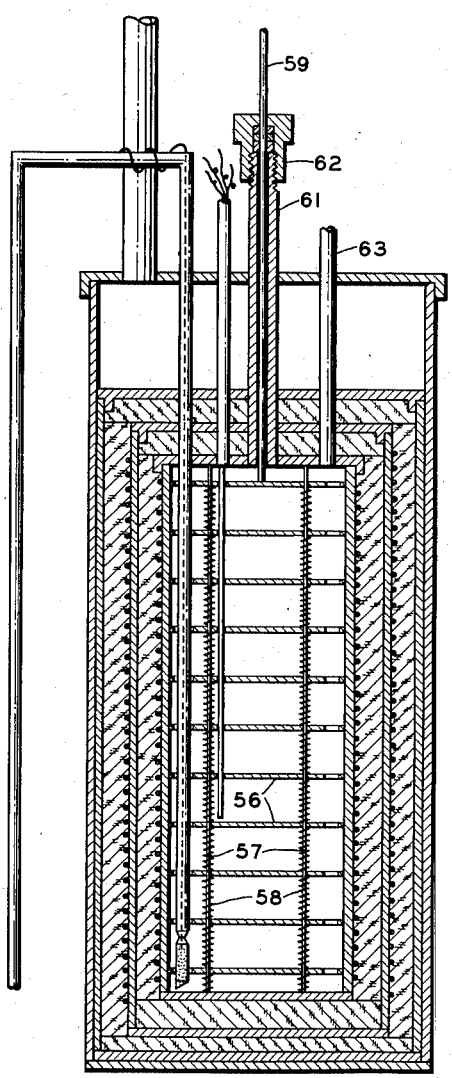
Figure 4 is another modification of our apparatus wherein the heat-dispersing means is a plurality of horizontal metal plates which are fitted onto vertical guide rods and which are held apart by means of spiral springs which ride on the guide rods between said plates.

The apparatus shown in Figure 4 is a modification of that shown in Figure 1 wherein the roll of gauze is replaced by a series of horizontal plates 56 which ride on vertical guides 57 and are held apart by means of spiral springs 58 which fit on said vertical guides. An activating rod 59 extends upward from the uppermost horizontal plate through tube 61 and stuffing box 62. Material is introduced into the inner container through tube 63.

*Operation*

The advantages of our invention will be more clearly understood from the following description of the method of operation. The apparatus shown in Figure 1 consists of an inner container, preferably copper, which is provided with a heater 16 and thermocouple 15. A roll of wire gauze 17 is placed in the container. This gauze may be of any conducting material which does not react with the material being processed. We have found copper to be an excellent material for this purpose. This wire gauze serves to facilitate equilibrium by rapidly equalizing the temperature throughout the sample. It also tends to expose a larger crystal surface to the equilibrium liquid since the crystals tend to form on the gauze surface.

The material to be processed is introduced into the material receiving container 14 through filling tube 18. The material may be introduced as a granular solid, as a slurry, or as a liquid, preferably the latter. If the material is introduced as a liquid, it must then be frozen inside the container by passing a cold gas through the liquid by means of the withdrawal tube 21, or by surrounding the outer container 6 with a refrigerating liquid. After the liquid within the container has been frozen, sufficient heat is added to melt that portion which will contain the impurity. Then, by suitably adjusting the heat input to the thermal shield 9, there is no heat interchange between the container and its surroundings. After attaining equilibrium adiabatically the liquid is withdrawn through removal tube 21. The heat is again added to the system by means of heater 16 to melt an additional portion of the solid within the container. After the flow of heat into the container has been stopped, the liquid and the remaining solid are once again allowed to equilibrate adiabatically. The liquid is then withdrawn from the container. This process is repeated until the solid remaining within the container has the desired purity. This is most conveniently determined by following the solid-liquid equilibrium temperature within the container.

The apparatus shown in Figure 3 permits mechanical compression of the sample being processed and also provides for rapid diffusion of the heat throughout the container. The spiral vanes 37 are made of a heat-conducting material, such as copper, and contain numerous perforations to permit flow of liquid therethrough. The material to be processed is introduced into the container by means of side tube 43 and tube 39. The freezing and melting process is carried out as described above. The liquid is drawn off through removal tube 48 after pressure has been applied to the vanes by means of activating rod 42 and activator vane 38. The solid material is pressed between the spiral vanes, which aids in removal of liquid from the solid. During the equilibrating period when the solid and liquid are in contact, the activator vane may be reciprocated to produce a certain amount of agitation within the sample and thereby facilitate the attainment of equilibrium.

When the sample within the container has attained the predetermined purity, it may be melted by the addition of heat through heater 35 and the liquid may then be withdrawn from the container.

The operation of the apparatus in Figure 4 is similar to that in Figure 3. The metal plates 56 have numerous perforations to permit flow of liquid from one section of the adjoining ones. Springs 58, which work on the guide rods 57 tend to keep these plates forced apart. Plates 56 are constructed of a heat conducting material so that heat added to one portion of the sample will be rapidly transmitted throughout the sample. Activator rod 59 is used to force the plates 56 together and express the liquid from the solid. This activator rod and metal plates may be used also to provide a certain amount of agitation within the sample during the equilibrating period.

Our apparatus may be used in the separation of eutectic-forming mixtures as well as solid solution-forming mixtures. If the sample to be processed is a eutectic-forming mixture, substantially all of the impurity can be removed by a single melting. Additional meltings may be desirable to remove any occluded liquid. If the impurity is solid-soluble with a distribution favoring the liquid phase, a plurality of meltings is desirable. The exact amount of the sample to be melted each time and the number of meltings to be employed depends on the individual sample and may be easily determined.

Our invention is applicable to any system wherein the components are not decomposed by melting. Obviously, the apparatus of this type is more useful in the separation of extremely low-melting materials which are valuable in the pure state. Examples are the separation of cis and trans-butene-2, meta and para xylenes, normal hexane and benzene, and other materials which melt below atmospheric temperatures. However, our invention is not limited to these particular systems, but may be used in resolving any mixture, provided the components thereof are not decomposed by melting. Our invention is not limited to any specific system, but is limited only by the following claims.

Having described our invention, we claim:

1. A fractional fusion apparatus which comprises in combination, a closed material receiving container; an upright mass of heat-conducting gauze within and extending throughout the length of said material receiving container; at least one first electrical heating element closely contacting the periphery of said material receiving container; a first layer of insulation material covering the surface of said material receiving container and said first heating element; a closed heater shield chamber closely fitted around said first layer of insulation; at least one second electrical heating element closely contacting the periphery of said heater shield chamber; a second layer of insulation covering the surface of said heater shield chamber and said second electrical heating element; a closed radiation shield chamber closely fitted around said second layer of insulation; a closed outer container closely fitted around the periphery of said radiation shield chamber; a filling tube extending from outside said outer container into said material receiving container; a liquid product removal conduit extending from the lower portion of said container to the exterior of said apparatus; and means to evacuate said outer container.

2. A fractional fusion apparatus which comprises in combination, a closed material receiving container; heat distribution means within said material receiving container comprising a loosely-wound spiral perforate ribbon substantially filling said container and having an opening therethrough; a heater well extending from the bottom of said material receiving container upwardly through the opening in said ribbon, forming a guide therefor; at least one first electrical heating element closely contacting the periphery of said material receiving container; a first layer of insulation material covering the surface of said material receiving container and said first heating element; a closed heater shield chamber closely fitted around said first layer of insulation; at least one second electrical heating element closely contacting the periphery of said heater shield chamber; a second layer of insulation covering the surface of said heater shield chamber and said second electrical heating element; a closed radiation shield chamber closely fitted around said second layer of insulation; a closed outer container closely fitted around the periphery of said radiation shield chamber; means for compressing and decompressing said spiral ribbon extending from outside said outer container into said material receiving container and operatively connected to said spiral ribbon; a filling tube extending from outside said outer container into said material receiving container; a liquid product removal line extending from the lower portion of said container to the exterior of said apparatus; and means to evacuate said outer container.

3. A fractional fusion apparatus which comprises in combination, a closed material receiving container; heat distribution means within said material receiving container comprising a plurality of plates slidably and horizontally disposed throughout said material receiving container and supported on vertical guide rods; springs on said guide rods, adapted so as to non-rigidly space said plates apart; at least one first electrical heating element closely contacting the periphery of said material receiving container; a first layer of insulation material covering the surface of said material receiving container and said first heating element; a closed heater shield chamber closely fitted around said first layer of insulation; at least one second electrical heating element closely contacting the periphery of said heater shield chamber; a second layer of insulation covering the surface of said heater shield chamber and said second electrical heating element; a closed radiation shield chamber closely fitted around said second layer of insulation; a closed outer container closely fitted around the periphery of said radiation shield chamber; means for moving said plates together and apart, extending from outside said outer container into said material receiving container and operatively connected to said plates; a filling tube extending from outside said outer container into said material receiving container; a liquid product removal line extending from the lower portion of said container to the exterior of said apparatus; and means to evacuate said outer container.

4. A fractional fusion apparatus which comprises in combination, a closed material receiving container; heat distribution means within said material receiving container and extending throughout that container; at least one first electrical heating element closely contacting the periphery of said material receiving container; a first layer of insulation material covering the surface of said material receiving container and said first heating element; a closed heater shield chamber closely fitted around said first layer of insulation; at least one second electrical heating element closely contacting the periphery of said heater shield chamber; a second layer of insulation covering the surface of said heater shield chamber and said second electrical heating element; a closed radiation shield chamber closely fitted around said second layer of insulation; a closed outer container closely fitted around the periphery of said radiation shield chamber; a filling tube extending from outside said outer container into said material receiving container; a liquid product removal line extending from the lower portion of said container to the exterior of said apparatus; and means to evacuate said outer container.

5. The fractional fusion apparatus of claim 4, wherein a porous plug is provided in the inlet end of said liquid product removal line.

JOHN G. ASTON.
SEBASTIAN V. R. MASTRANGELO.

REFERENCES CITED

The following references are of record in the file of this patent:

UNITED STATES PATENTS

| Number | Name | Date |
|---|---|---|
| 1,929,511 | Mulkey | Oct. 10, 1933 |
| 1,943,749 | Trent | Jan. 16, 1934 |
| 1,967,185 | Clapp | July 17, 1934 |
| 2,112,743 | Poole | Mar. 29, 1938 |
| 2,499,043 | Voorhees | Feb. 28, 1950 |

FOREIGN PATENTS

| Number | Country | Date |
|---|---|---|
| 441,283 | Germany | Mar. 1, 1927 |